US008578566B2

(12) United States Patent
Jolly et al.

(10) Patent No.: US 8,578,566 B2
(45) Date of Patent: Nov. 12, 2013

(54) CABLE GRIPPING DEVICE

(75) Inventors: Robert K. Jolly, Cordova, TN (US); Joey D. Magno, Jr., Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 211 days.

(21) Appl. No.: 12/917,139

(22) Filed: Nov. 1, 2010

(65) Prior Publication Data

US 2011/0041292 A1   Feb. 24, 2011

Related U.S. Application Data (63) Continuation-in-part of application No. 11/981,231, filed on Oct. 31, 2007, now Pat. No. 8,001,660.

(51) Int. Cl.
*F16G 11/10* (2006.01)
(52) U.S. Cl.
USPC .................... 24/136 R; 24/136 A; 292/307 R
(58) Field of Classification Search
None
See application file for complete search history.

(56) References Cited

U.S. PATENT DOCUMENTS

| 206,169 | A | 7/1878 | Fayman |
|---|---|---|---|
| 749,896 | A | 1/1904 | Brown |
| 1,069,135 | A | 8/1913 | Heberling |
| 1,139,595 | A | 5/1915 | Starr |
| 1,165,785 | A | 12/1915 | Knoche |
| 1,201,169 | A | 10/1916 | Goepel |
| 1,203,782 | A | 11/1916 | Raymond |
| 1,238,167 | A | 8/1917 | McIntyre |
| 1,269,507 | A | 6/1918 | Proctor |
| 1,271,912 | A | 7/1918 | Kemper |
| 1,692,993 | A | 11/1928 | Lambert |
| 1,811,942 | A | 6/1931 | Kemper et al. |
| 2,356,209 | A | 8/1944 | Brilhart |
| 2,458,304 | A | 1/1949 | Runde |
| 2,897,563 | A | 8/1959 | Jonovich |
| 2,983,012 | A | 5/1961 | Madden |
| 3,094,755 | A | 6/1963 | Casanave |
| 3,770,307 | A | 11/1973 | Van Gompel |
| 3,900,184 | A | 8/1975 | Burke et al. |
| 4,049,303 | A | 9/1977 | Irwin et al. |

(Continued)

FOREIGN PATENT DOCUMENTS

| CA | 2117452 C | 4/1995 |
|---|---|---|
| CA | 2170701 C | 5/1997 |

(Continued)

OTHER PUBLICATIONS

Gripple Products—Gripple Rope Grips—www.gripple.com/construction/product Sep. 5, 2007.

(Continued)

*Primary Examiner* — Jack W. Lavinder
(74) *Attorney, Agent, or Firm* — Butler, Snow, O'Mara, Stevens & Cannada PLLC (57) ABSTRACT

A device for gripping a cable is presented that has a retention member rotatably disposed within a cable guide such that upon entrance of the cable within an entrance port, the cable moves between the retention member and a wall, causing the retention member to simultaneously rotate and move toward the exit port and away from the wall until it abuts the exit wall and rotates in place as the cable is pushed out the exit port. When the cable is pulled toward the entrance port, the retention member simultaneously rotates and moves toward the entrance port and the wall, wedging the cable between the wall and the retention member.

16 Claims, 4 Drawing Sheets

(56) References Cited

U.S. PATENT DOCUMENTS

| | | |
|---|---|---|
| 4,640,538 A | 2/1987 | Brammall |
| 4,681,355 A | 7/1987 | Brammall et al. |
| 4,747,631 A | 5/1988 | Loynes et al. |
| 4,830,340 A | 5/1989 | Knitig |
| 4,878,270 A | 11/1989 | Westerkamp |
| 5,015,023 A | 5/1991 | Hall |
| 5,020,192 A | 6/1991 | Gerlach |
| 5,092,641 A | 3/1992 | Penick |
| 5,147,145 A | 9/1992 | Facey et al. |
| 5,282,825 A | 2/1994 | Muck et al. |
| 5,538,300 A | 7/1996 | Brown |
| 6,003,210 A | 12/1999 | Facey et al. |
| 6,058,574 A | 5/2000 | Facey et al. |
| 6,131,969 A | 10/2000 | Natkins |
| D467,795 S | 12/2002 | Lyons |
| 6,546,600 B1 | 4/2003 | Lyons |
| 6,599,054 B2 | 7/2003 | Ouimet |
| D553,575 S | 10/2007 | Littrell et al. |
| D574,701 S | 8/2008 | Clarke |
| D579,411 S | 10/2008 | Jowett |
| 2003/0115723 A1 | 6/2003 | Shuey |
| 2006/0196016 A1 | 9/2006 | Cai et al. |
| 2009/0106947 A1 | 4/2009 | Cai et al. |
| 2010/0038611 A1 | 2/2010 | Lambourn et al. |

FOREIGN PATENT DOCUMENTS

| | | |
|---|---|---|
| CA | 2242576 C | 6/1999 |
| CA | 2295345 C | 9/2000 |
| CA | 2424845 A1 | 10/2003 |
| CA | ID120231 S | 1/2008 |
| CA | 2676420 A1 | 8/2008 |
| CA | 2710568 A1 | 9/2009 |
| DE | 3505437 A1 | 5/1986 |
| EP | 1698802 A2 | 6/2006 |
| EP | 1698802 A3 | 10/2007 |
| EP | 1967759 A1 | 10/2008 |
| FR | 2226882 | 11/1974 |
| GB | 301285 | 11/1928 |
| GB | 2322435 A | 8/1996 |
| GB | 2430234 A | 3/2007 |
| WO | WO 93/04303 | 3/1993 |
| WO | WO 00/01958 | 1/2000 |
| WO | 2010002265 A1 | 1/2010 |
| WO | 2010142690 A1 | 12/2010 |

OTHER PUBLICATIONS

Caddy Speed Link—Erico—Caddy Speed Link Universal Support System—www.erico.com/products Oct. 4, 2004.
KwikWire—Cooper—Kwik Wire Hanging System—www.cooperbline.com/kwikwire Oct. 30, 2007.
Riz Enterprises, LLC—Zip Clip—www.zip-clip.com Oct. 30, 2007.

CABLE GRIPPING DEVICE

CROSS REFERENCES TO RELATED APPLICATIONS

This application is a continuation in part of U.S. application Ser. No. 11/981,231 which was filed on Oct. 31, 2007, and which is hereby incorporated by reference in its entirety.

FIELD OF THE INVENTION

In general, the present invention relates to gripping devices and, in particular, to a device for releasably gripping a cable.

BACKGROUND

Industrial, commercial and residential construction sites typically require the suspension of equipment (such as HVAC units and ducts, lighting structures, various construction equipment and tools, audio speakers, and roofing materials) from structural members (such as overhead beams, ceilings, roofs, cranes, and girders). A suspension cable, such as a metallic or rubber rope or wire, is used to aid in this suspension. It is typically attached on one end to the structural member, such as an eyebolt, anchor or shot fired member. Alternatively, the suspension cable can be inserted through a wedge device, looped around the equipment, and, finally, inserted through the wedge device a second time to retain the cable in place and suspend the equipment that is supported by the cable. Such prior wedge devices are not hermaphroditic and are difficult to manufacture and assemble. They also consist of many parts and are costly to manufacture.

SUMMARY

The present invention eliminates the above difficulties and disadvantages by providing an improved device for gripping a cable. The device comprises a first entrance port for receiving the cable and a first entrance wall wherein the entrance port is disposed. A first exit port is aligned with the first entrance port and from where the cable exits the device. A first exit wall is included wherein the first exit port is disposed and a first wall is disposed between the first entrance port and the first exit port. A first cable guide forms a pathway between the first entrance port and the first exit port and generally slopes toward the first exit port. A first retention member is rotatably disposed within the first cable guide. Because rotation friction is less than the sliding friction, upon entrance of a cable within the first entrance port, the cable moves between the first retention member and the first wall, causing the first retention member to simultaneously rotate and move toward the first exit port and away from the first wall until it abuts the first exit wall and rotates in place as the cable is pushed out the first exit port.

Because rotation friction is less than the sliding friction, extracting the cable is highly difficult without destroying the cable gripping device. For instance, when the cable is pulled near the first entrance port, the first retention member rolls toward the first entrance port, and the first cable guide forces the first retention member toward the first entrance port, which slopes toward the first entrance port, thereby wedging the cable with great force between the first wall of the cable gripping device and the first retention member.

A second entrance port is provided for receiving the free end of the cable after it leaves the first exit port and is inserted through an eyelet, for example, that is attached to equipment or bundled around a group of generally linear items for shipping such as logs or electrical distribution poles. The device further includes a second entrance port for receiving the cable and a second entrance wall wherein the entrance port is disposed. A second exit port is aligned with the second entrance port and from where the cable exits the device. A second exit wall is included wherein the second exit port is disposed, and a second wall is disposed between the second entrance port and the second exit port. A second cable guide forms a pathway between the second entrance port and the second exit port and generally slopes toward the second exit port. A second retention member is rotatably disposed within the second cable guide. Because rotation friction is less than the sliding friction, upon entrance of a cable within the second entrance port, the cable moves between the second retention member and the second wall, causing the second retention member to simultaneously rotate and move toward the second exit port and away from the second wall until it abuts the second exit wall and rotates in place as the cable is pushed out the second exit port.

Because rotation friction is less than the sliding friction, extracting the cable is highly difficult without destroying the cable gripping device. For instance, when the cable is pulled near the second entrance port, the second retention member rolls toward the second entrance port, and the second cable guide forces the second retention member toward the second entrance port, which slopes toward the second entrance port thereby wedging the cable with great force between the second wall of the cable gripping device and the second retention member.

Release means are provided in the present invention via spring-loaded release pins that allow the user to move the retention members away from the cable.

BRIEF DESCRIPTION OF THE DRAWINGS

Further advantages of the invention will become apparent by reference to the detailed description of preferred embodiments when considered in conjunction with the drawings.

DETAILED DESCRIPTION OF THE PREFERRED EMBODIMENT

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Figure 1:
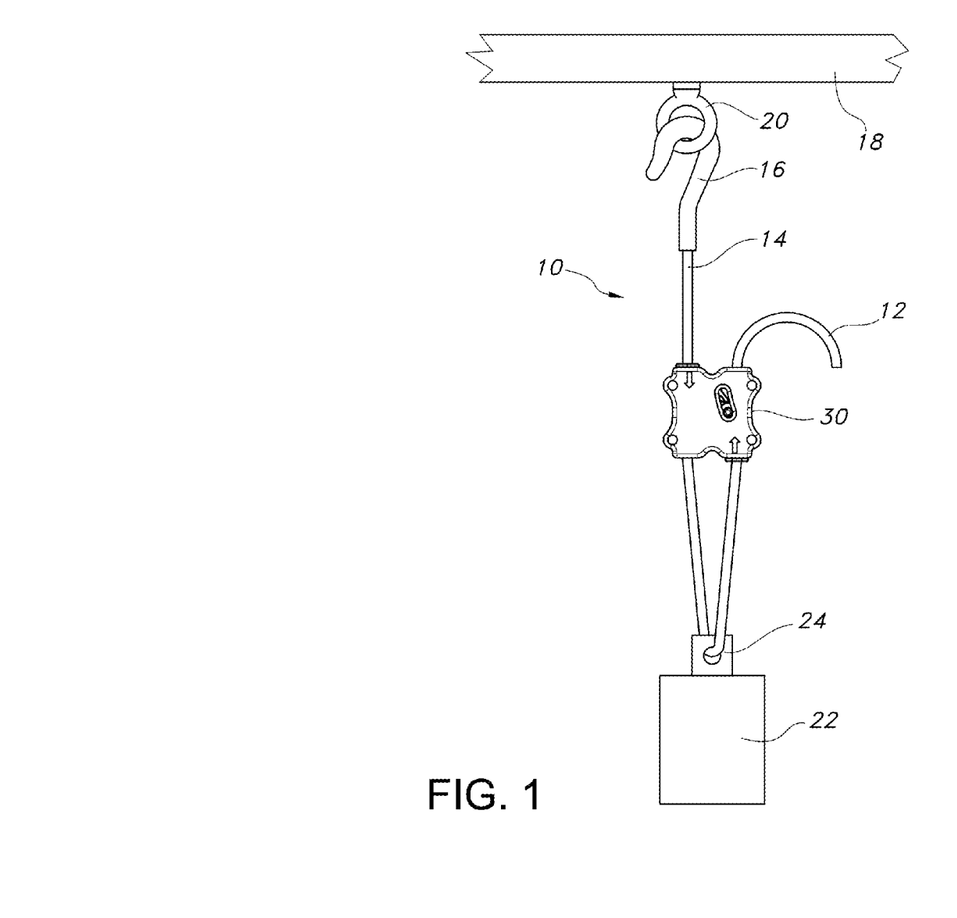
FIG. 1 is a side elevational view of an equipment hanging system having a device for gripping a cable of the present invention.

Shown in FIG. 1 is a system for hanging equipment 22 or bundling a group of objects such as logs or electrical distribution poles for shipping. The system includes a cable 10 that may be secured to a structural member 18, such as a support beam by a hook 16, the hook 16 being secured to an attachment end 14 of the cable 10 via a crimp device or soldering. The hook 16 engages an eyelet 20 that is mounted on the structural member 18. The free end 12 of the cable 10 is inserted through device 30 and then inserted through an eye 24 that is secured to the equipment 22 and finally back through device 30 that secures the cable 10 from slipping and allows the equipment 22 to be suspended in air. The present system and device have many applications. For use in bundling objects together, the cable is wrapped around the objects, and then both ends are secured using the cable gripping device.

Figure 2:
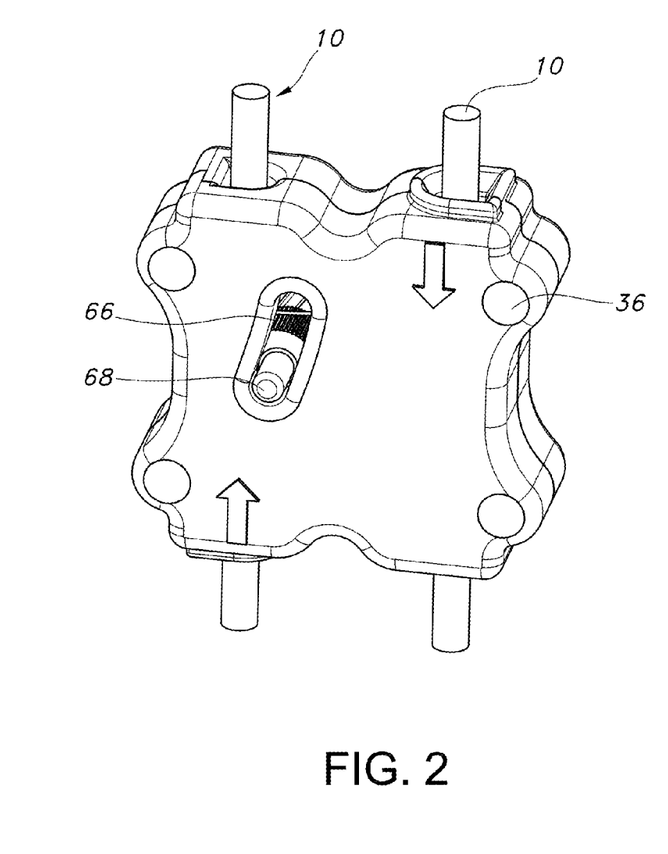
FIG. 2 is a perspective view from the front of the device for gripping a cable of the present invention with the cables inserted.
Figure 3:
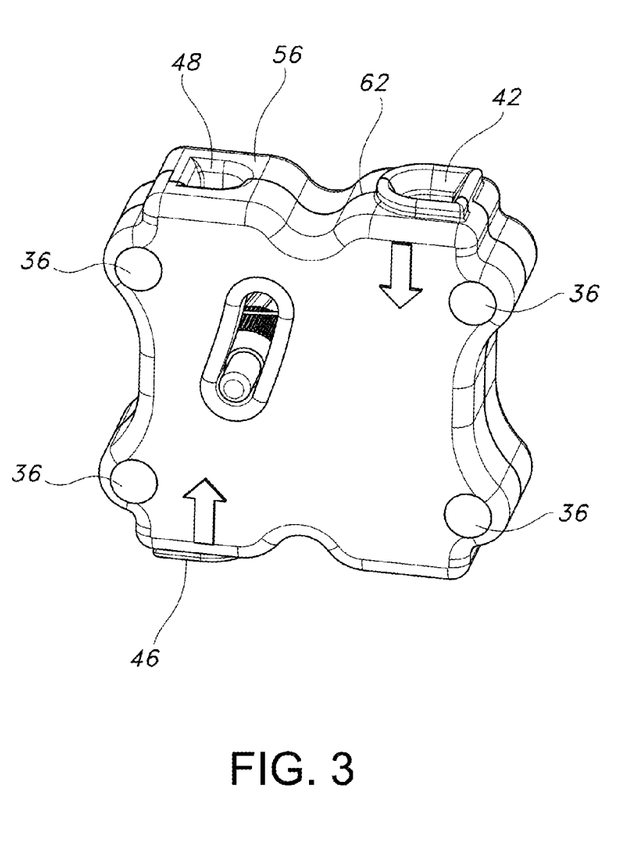
FIG. 3 is a perspective view of the device from the front for gripping a cable of the present invention.

FIGS. 2 and 3 depict the outside of the device, both with and without being attached to a cable 10. The device 30 is preferably constructed of a rust inhibited metal such as galvanized steel, but can also be constructed of a thermo-formed plastic or any other rigid material. The device 30 is comprised of two half shells, first shell 32 and second shell 34, which are preferably welded or riveted together. Standoffs 38 are integrally formed into second shell 34 and preferably made of the same material as second shell 34. Standoffs 38 are preferably riveted at 36 to first shell 32 to stake the first shell 32 to the second shell 34 and keep the device 30 closed to prevent tampering in the field.

Figure 4:
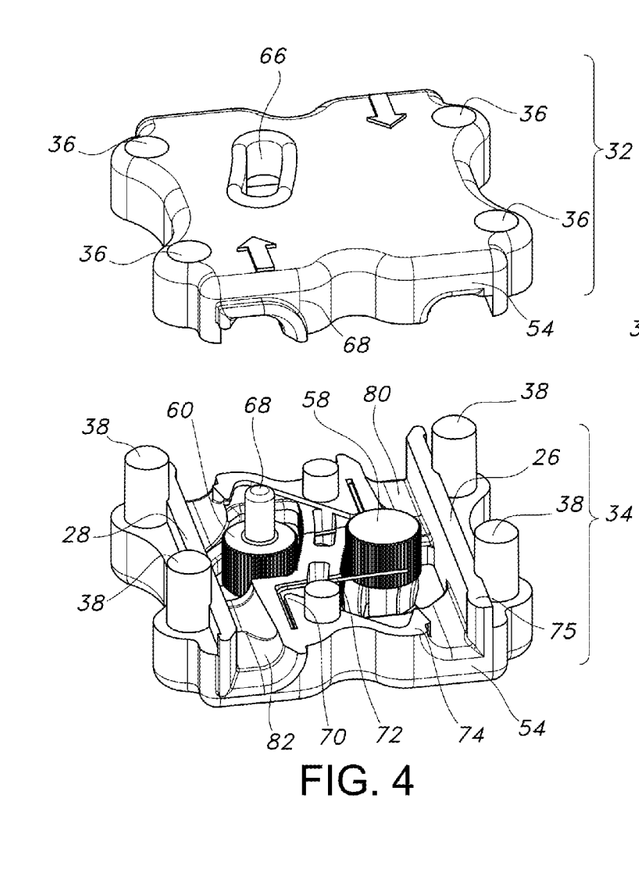
FIG. 4 is a perspective view of the device from the side with the upper shell separated from the bottom shell to expose the inner mechanism of the device.
Figure 5:
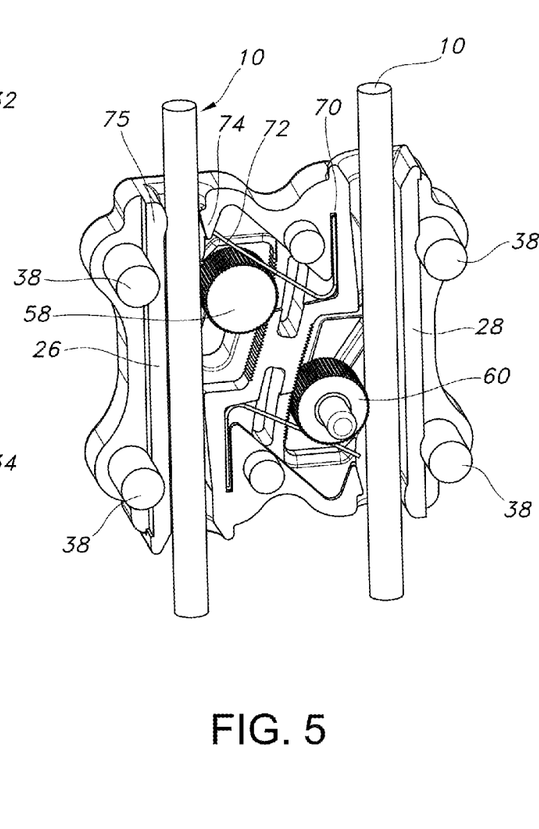
FIG. 5 is a view of the device for gripping a cable shown with a cable inserted and with the upper shell removed to expose the inner mechanism of the device.
Figure 6:
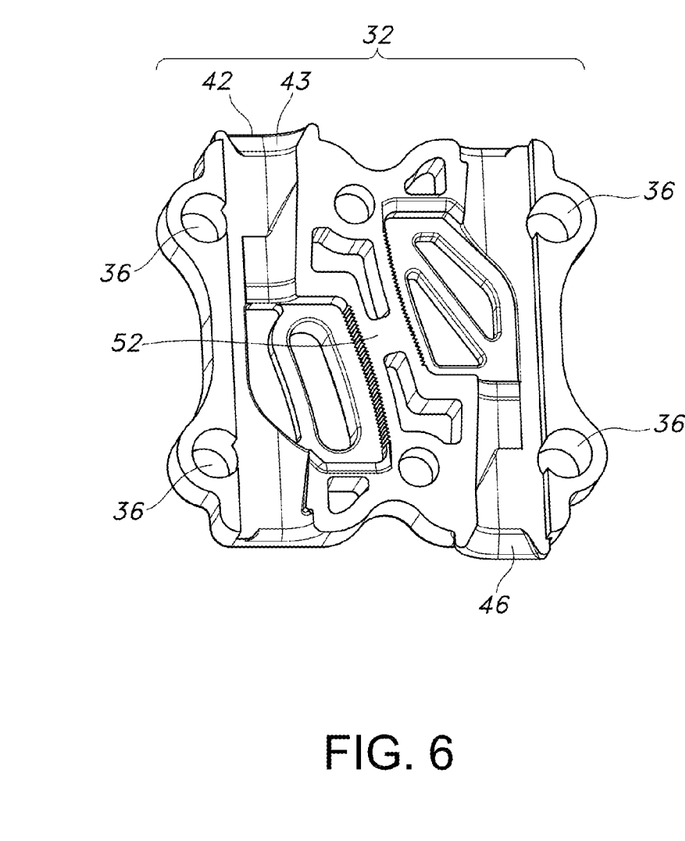
FIG. 6 is a view of the upper shell of the device.

It should be appreciated from FIGS. 4 and 5 that the device 30 only has few separable parts: the first and second shells 32 and 34, the first and second retention members 58 and 60, respectively, and wire spring 72. The small number of parts greatly reduces the manufacturing and installation costs of device 30.

Referring to FIG. 3, a first entrance port 42 is provided for receiving the free end 12 of cable 10. The first entrance port 42 can have any shape that would allow for insertion of cable 10, but preferably has at least a partially curved shape to reduce friction between the cable 10 and the opening. The first entrance port 42 is angled or beveled to aid in entrance of the free end 12 of cable 10 and is disposed in a first entrance wall 62. A first exit port 44 is provided opposite the first entrance port 42 that preferably has at least a partially curved shape, but could be of any shape that would allow for the passage through of cable 10. The first exit port 44 is axially aligned with the first entrance port 42. It is from the first exit port 44 where the free end 12 of cable 10 exits device 30. The first exit port 44 is disposed in a first exit wall 54. A first wall 26 is disposed between, and adjoins, the first entrance port 42 and the first exit port 44. The first wall 26 is smooth on the interior of the device 30 and its outer surface is of any desired texture or shape to aid in gripping of the device 30 by an installer.

In addition, a first cable guide 80 forms a pathway between the first entrance port 42 and the first exit port 44. The first wall 26 is formed at right angles to the first entrance wall 62 and first exit wall 54. A dividing wall 52, which is preferably constructed of the same material as the rest of the device 30, separates the pathways on both sides of the device 30.

A first retention member 58 is included that is preferably made of metal, but can be made of any durable material such as thermo-formed plastic. The first retention member 58 is generally disc-shaped, with a retention member release pin 68 extending from the center thereof. The retention member release pin 68 allows first retention member 58 to rotate or slide along a groove formed in the first shell 32, referred to herein as retention member release slot 66. The first retention member 58 is rotatably disposed along the edge of first cable guide 80 such that upon entrance of the cable 10 within the first entrance port 42, the cable 10 moves between the first retention member 58 and the first wall 26, causing the first retention member 58 to simultaneously rotate and move along the retention member release slot 66 toward the first exit port 44 and away from the first wall 26. The surface of the first retention member 58 that contacts cable 10 has gear-like teeth that grip into cable 10. The first retention member 58 rotates on an axis formed by its retention member release pin 68 which is orthogonal to the direction of cable movement through the device 30.

Figure 7:
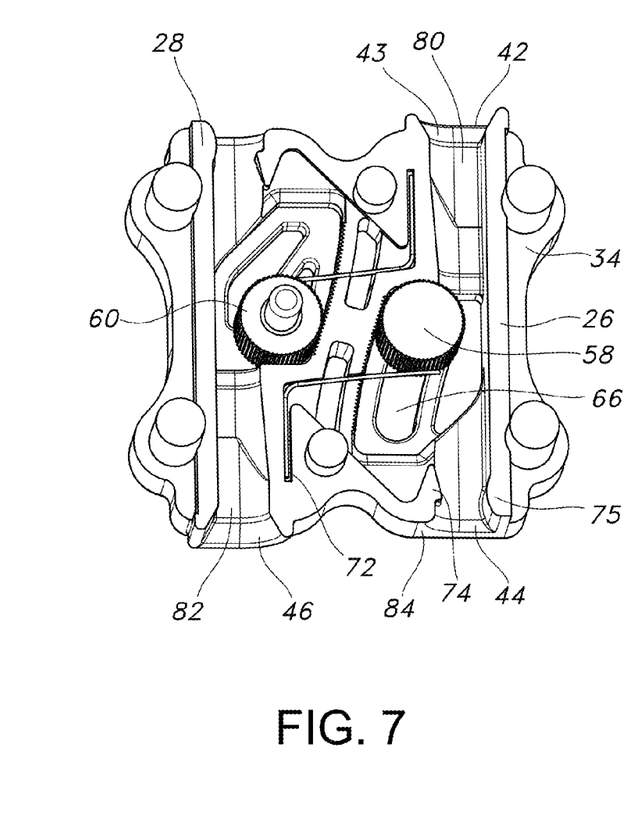
FIG. 7 is another view of the bottom shell with the upper shell removed to expose the inner mechanism of the device.

Retention member release slot 66 is curved as shown in FIG. 2 and FIG. 7, such that, as the first retention member 58 moves toward first exit wall 54, it moves away from first wall 26. First retention member 58 is pushed toward the first entrance port 42 by retention member wire spring 72. Retention member wire spring 72 is an L-shaped spring that exerts force against first retention member 58. One end of the retention member wire spring 72 is disposed in second shell 34 by the wire spring retaining slot 70. As will be appreciated from FIG. 5, when a cable 10 is inserted into device 30, the spring tension of retention member wire spring 72 keeps first retention member 58 pressed against cable 10.

After insertion of cable 10 in the manner described above, when cable 10 is pulled in the opposite direction by an installer grasping cable 10 near the first entrance port 42 and pulling away from the device 30, the first retention member 58 simultaneously rotates and moves toward the first entrance wall 62 and rises toward the first wall 26 until it is prevented from rotating further, wedging cable 10 between the first wall 26 and the first retention member 58. The gear-like teeth around first retention member 58 engage with similar sized teeth lining dividing wall 52, thus providing additional traction to first retention member 58 so that it does not slip. The gear like teeth around first retention member 58 also provide more traction against cable 10 to prevent it from sliding against first retention member 58. When this wedging occurs, the cable 10 cannot be pulled from the device 30 without extreme force that may actually break the device 30. Therefore, the load the cable 10 has on it is prevented from slipping and falling to the ground.

The mechanism of which allows cable 10 to be pushed through the first entrance port 42 through the device 30 and exiting first exit port 44 is replicated on the other side of dividing wall 52, but in reverse direction so that a cable 10 is pushed through second entrance port 46 and exits second exit port 48.

The second entrance port 46 is also angled or beveled for receiving the free end 12 of cable 10 after it leaves the first exit port 44 and is inserted through the eye 24, for example, that is attached to the equipment 22 or bundled around a group of generally linear items for shipping such items as logs. The second entrance port 46 can have any shape that would allow for insertion of cable 10, but preferably has at least a partially curved shape to reduce friction between the cable and the opening. The second entrance port 46 is angled or beveled to aid in entrance of the free end 12 of cable 10 and is disposed in a second entrance wall 64. A second exit port 48 is provided opposite the second entrance port 46 and can have any shape that would allow for insertion of cable 10, but preferably has at least a partially curved shape to reduce friction between the cable 10 and the opening. The second exit port 48 is axially aligned with the second entrance port 46. It is from the second exit port 48 where the free end 12 of cable 10 exits device 30. The second exit port 48 is disposed in a second exit wall 56. A second wall 28 is disposed between, and adjoins, the second entrance port 46 and the second exit port 48. The second wall 28 is smooth on the interior of the device 30, and its outer surface is of any desired texture or shape to aid in gripping of the device 30 by an installer.

In addition, a second cable guide 82 forms a pathway between the second entrance port 46 and the second exit port 48. The second wall 28 is formed at right angles to the second entrance wall 64 and second exit wall 56. A dividing wall 52, which is preferably constructed of the same material as the rest of the device 30, separates the first cable guide 80 from second cable guide 82.

A second retention member 60 is included that is preferably made of metal, but can be made of any durable material such as thermo-formed plastic. The second retention member 60 is generally disc-shaped, with a retention member release pin 68 extending from the center thereof. The retention member release pin 68 allows second retention member 60 to rotate or slide along a groove formed in the first shell 32, referred to herein as retention member release slot 66. The second retention member 60 is rotatably disposed along the edge of second cable guide 82 such that upon entrance of the cable 10 within the second entrance port 46, the cable 10 moves between the second retention member 60 and the second wall 28, causing the second retention member 60 to simultaneously rotate and move toward the second exit port 48 and away from the second wall 28. The surface of the first retention member 58 that contacts cable 10 has gear-like teeth that grip into cable 10. The second retention member 60 rotates on an axis formed by its retention member release pin 68 which is orthogonal to the direction of cable movement through the device 30. Therefore, easy insertion of cable 10 into the second entrance port 46, through the second cable guide 82 and out the second exit port 48 is provided.

Retention member release slot 66 is curved as shown in FIG. 2 and FIG. 7 such that, as the second retention member 60 moves toward second exit wall 56, it moves away from second wall 28. First retention member 60 is pushed toward the second entrance port 46 by retention member wire spring 72. Retention member wire spring 72 is an L-shaped spring that exerts force against second retention member 60. One end of the retention member wire spring 72 is disposed in second shell 34 by the wire spring retaining slot 70. As will be appreciated from FIG. 5, when a cable 10 is inserted into device 30, the spring tension of retention member wire spring 72 keeps second retention member 60 pressed against cable 10.

After insertion of cable 10 in the manner described above, when cable 10 is pulled in the opposite direction by an installer grasping cable 10 near the second entrance port 46 and pulling away from the device 30, the second retention member 60 simultaneously rotates and moves toward the second entrance wall 64 and rises toward the second wall 28 until it is prevented from rotating further, wedging cable 10 between the second wall 28 and the second retention member 60. The gear-like teeth around second retention member 60 engage with similar sized teeth lining dividing wall 52, thus, providing additional traction to second retention member 60 so that it does not slip. The gear like teeth around second retention member 60 also provide more traction against cable 10 to prevent it from sliding against second retention member 60. When this wedging occurs, the cable 10 cannot be pulled from the device 30 without extreme force that may actually break the device 30. Therefore the load the cable 10 has on it is prevented from slipping and falling to the ground.

It is also noted that the dividing wall 52 separates the first cable guide 80 from the second cable guide 82 such that the first and second retention members, 58 and 60, respectively, do not come into contact with each other.

The retention member release pins 68 on both sides of device 60 not only limit the pathway that the retention member travels, but also may be used to release the cable from the device so that it may be pulled back out in the direction of the entrance ports. Retention member release pin 68 extends beyond the lip of retention member release slot 66 so that it can be manipulated by the user of device 30. To release the cable 10, the retention member release pin 68 is pushed toward the exit ports. This causes the retention member 58 or 60 to move against the spring tension of retention member wire spring 70. With the retention member 58 or 60 no longer pressing against the cable 10, cable 10 can be pulled from device 30 toward the entrance ports.

It should be appreciated that the device 30 can also include means to prevent the free end of cable 12 from being inserted through an exit port. Both the first exit port 44 and second exit port 48 include a restrictor 74 and rounded raised node 75 which prevent free end 12 of cable 10 from being inserted into that exit port. The restrictor 74 is a flexible piece of material surrounding the exit port that juts into cable guide. It is configured to snag on the free end 12 of cable 10 that is improperly inserted into the exit port. A cable 10 that is properly inserted through the device 30 by way of an entrance port will cause the restrictor 74 to flex toward the exit port, thus exposing a smooth surface which will not impede the free end 12 of cable 10 from exiting device 30.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all sub-ranges and individual values are intended to be encompassed. This invention is not to be limited by the embodiments disclosed, including any shown in the drawings or exemplified in the specification, which are given by way of example and not of limitation.

We claim:

1. A device for gripping a cable having a free end, the device comprising:
   an entrance port for receiving the free end of the cable;
   an exit port aligned with the entrance port and from where the free end of the cable exits the device;
   a wall disposed between the entrance port and the exit port;

a cable guide forming a pathway between the entrance port and the exit port;

a retention member having gear-like teeth and rotatably disposed within the cable guide such that upon entrance of the cable within the entrance port, the cable moves between the retention member and the wall, causing the retention member to simultaneously rotate and move toward the exit port as the cable is pushed out the exit port; and a retention member spring which is configured to exert force against the retention member such that the retention member wedges the cable between the wall and the retention member, wherein said exit port includes a flexible restrictor that hinders the free end of a cable from being inserted into said exit port.

2. The device of claim 1 wherein the retention member rotates on an axis that is orthogonal to the direction of cable movement through the device.

3. The device in claim 1 wherein the retention member is unattached within the device.

4. The device of claim 1 wherein the retention member moves along a defined path.

5. The device of claim 1 wherein the device is constructed of metal.

6. A device for gripping a cable having a free end, the device comprising:

a first entrance port for receiving the free end of the cable.

a first exit port aligned with the first entrance port and from where the free end of the cable exits the device;

a first wall disposed between the first entrance port and the first exit port;

a first cable guide forming a pathway between the first entrance port and the first exit port, said first cable guide having a first surface of a dividing wall lined with teeth;

a first retention member having gear-like teeth configured to engage with said teeth of the first surface of the dividing wall and wherein said first retention member is rotatably disposed within the first cable guide such that upon entrance of the cable within the first entrance port, the cable moves between the first retention member and the first wall, causing the first retention member to simultaneously rotate and move toward the first exit port as the cable is pushed out the first exit port, and a first retention member spring which is configured to exert force against the first retention member such that the first retention member wedges the cable between the first wall and the first retention member;

a second entrance port for receiving the free end of the cable;

a second exit port aligned with the second entrance port and from where the free end of the cable exits the device;

a second wall disposed between the second entrance port and the second exit port;

a second cable guide forming a pathway between the second entrance port and the second exit port, wherein said second cable guide has a second surface of said dividing wall lined with teeth;

a second retention member having gear-like teeth configured to engage with said teeth of the second surface of the dividing wall and wherein said second retention member is rotatably disposed within the second cable guide such that upon entrance of the cable within the second entrance port, the cable moves between the second retention member and the second wall, causing the second retention member to simultaneously rotate and move toward the second exit ort as the cable is rushed out the second exit port; and a second retention member spring which is configured to exert force against the second retention member such that the second retention member wedges the cable between the second wall and the second retention member, wherein said first exit port includes a first flexible restrictor that hinders a cable from being inserted into said first exit port and said second exit port includes a second flexible restrictor that hinders the free end of the cable from being inserted into said second exit port.

7. The of claim 6 wherein the first and second retention members rotate on an axis that is orthogonal to the direction of cable movement through the device.

8. The device of claim 6 wherein the first and second retention members exert force against the cable due to spring tension.

9. The device of claim 6 further comprising a retention member release pin, said retention member release pin affixed to a first or second retention member allowing the first or second retention member to be moved away from said cable.

10. The device of claim 6 wherein the first and second retention members are constructed of metal.

11. A device for gripping a cable having a free end, the device comprising:

a first entrance port for receiving the free end of the cable;

a first exit port aligned with the first entrance port and from where the free end of the cable exits the device;

a first wall disposed between the first entrance port and the first exit port;

a first cable guide forming a pathway between the first entrance port and the first exit port, said first cable guide having a first surface of a dividing wall lined with teeth;

a first retention member having gear-like teeth configured to engage with said teeth of the first surface of the dividing wall and wherein said first retention member is rotatably disposed within the first cable guide such that upon entrance of the cable within the first entrance port, the cable moves between the first retention member and the first wall, causing the first retention member to simultaneously rotate and move toward the first exit port as the cable is pushed out the first exit port, and a first retention member spring which is configured to exert force against the first retention member such that the first retention member wedges the cable between the first wall and the first retention member;

a second entrance port for receiving the free end of the cable;

a second exit port aligned with the second entrance port and from where the free end of the cable exits the device;

a second wall disposed between the second entrance port and the second exit port;

a second cable guide forming a pathway between the second entrance port and the second exit port, said second cable guide having a second surface of the dividing wall lined with teeth;

a second retention member having gear-like teeth configured to engage with said teeth of the second surface of the dividing wall and wherein said second retention member is rotatable disposed within the second cable guide such that upon entrance of the cable within the second entrance port, the cable moves between the second retention member and the second wall, causing the second retention member to simultaneously rotate and move toward the second exit port as the cable is pushed out the second exit port;

a second retention member spring which is configured to exert force against the second retention member such that the second retention member wedges the cable between the second wall and the second retention member;

a first retention member release pin, said first retention member release pin affixed to said first retention member allowing the first retention member to be moved away from said cable; and a second retention member release pin, said second retention member release pin affixed to said second retention member allowing the second retention member to be moved away from said cable, wherein said first exit port includes a first flexible restrictor that hinders a cable from being inserted into said first exit port and said second exit port includes a second flexible restrictor that hinders the free end of the cable from being inserted into said second exit port.

12. The device of claim 11 wherein the first and second retention members rotate on an axis that is orthogonal to the direction of cable movement through the device.

13. The device of claim 11 wherein the first and second retention members are unattached within the device.

14. The device of claim 11 wherein the first and second retention members are constructed of metal.

15. The device of claim 11 wherein a retention member is constructed of metal.

16. The device of claim 11 wherein the first members moves along a path defined by a first retention member release slot and the second retention member moves along a path defined by a second retention member release slot.

\* \* \* \* \*